US010726366B2

(12) United States Patent
Banerjee et al.

(10) Patent No.: US 10,726,366 B2
(45) Date of Patent: Jul. 28, 2020

(54) SCHEDULING AND SIMULATION SYSTEM (71) Applicant: International Business Machines Corporation, Armonk, NY (US)

(72) Inventors: Dipyaman Banerjee, New Delhi (IN); Gregory J. Chiarella, Longmont, CO (US); Yunwu Huang, Chappaqua, NY (US); Igor Khapov, Moscow (RU); Amitkumar M. Paradkar, Mohegan Lake, NY (US); Birgit M. Pfitzmann, Wettswil (CH)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 14/685,948

(22) Filed: Apr. 14, 2015

(65) Prior Publication Data
US 2016/0307145 A1  Oct. 20, 2016

(51) Int. Cl.
*G06Q 10/00* (2012.01)
*G06Q 10/06* (2012.01)

(52) U.S. Cl.
CPC ........... *G06Q 10/063116* (2013.01); *G06Q 10/063118* (2013.01); *G06Q 10/06311* (2013.01)

(58) Field of Classification Search
None
See application file for complete search history.

(56) References Cited

U.S. PATENT DOCUMENTS

| | | | | |
|---|---|---|---|---|
| 7,487,105 | B2* | 2/2009 | Jacobs | G06Q 10/02 705/7.19 |
| 7,793,294 | B2* | 9/2010 | Haeri | G06F 9/4887 718/102 |
| 8,285,681 | B2* | 10/2012 | Prahlad | G06F 3/0649 707/640 |
| 8,285,762 | B2 | 10/2012 | Cannon et al. | |
| 8,583,467 | B1* | 11/2013 | Morris | G06Q 10/06 705/7.26 |
| 9,747,156 | B2* | 8/2017 | Nakajima | G06F 11/3409 |
| 2004/0088704 | A1* | 5/2004 | Owen | G06F 9/4825 718/100 |
| 2009/0119126 | A1* | 5/2009 | Johnson | G16H 40/20 705/2 |
| 2009/0254411 | A1* | 10/2009 | Bhattacharya | G06Q 10/00 705/7.28 |

(Continued)

OTHER PUBLICATIONS

Arauzo, Jose Alberto, Agent-Based Modeling and Simulation of Multi-Project Scheduling, Aug. 27, 2009, Social Systems Engineering Centre (INSISOC), http://ceur-ws.org/Vol-494/masspaper8.pdf, p. 1-7.*

(Continued)

*Primary Examiner* — Joseph M Waesco
(74) *Attorney, Agent, or Firm* — Rakesh Roy (57) ABSTRACT

Evaluating project schedules on a computer system. One or more tasks are identified and corresponding set of deterministic task durations are determined. An initial schedule for completing the tasks is generated based on the deterministic task durations and based on one or more resources. A set of probabilistic durations for the tasks are determined and execution of the tasks is simulated according to the initial schedule based on the set of probabilistic durations.

17 Claims, 6 Drawing Sheets (56) References Cited

U.S. PATENT DOCUMENTS

| | | | | |
|---|---|---|---|---|
| 2010/0325637 | A1* | 12/2010 | Radmilac | G06F 9/5083 718/104 |
| 2010/0332401 | A1* | 12/2010 | Prahlad | G06F 3/0649 705/80 |
| 2010/0332454 | A1* | 12/2010 | Prahlad | G06F 3/0649 707/654 |
| 2010/0332456 | A1* | 12/2010 | Prahlad | G06F 3/0649 707/664 |
| 2010/0332479 | A1* | 12/2010 | Prahlad | G06F 3/0649 707/741 |
| 2010/0332818 | A1* | 12/2010 | Prahlad | G06F 3/0649 713/150 |
| 2010/0333116 | A1* | 12/2010 | Prahlad | G06F 3/0649 719/328 |
| 2011/0125539 | A1* | 5/2011 | Bollapragada | G06Q 10/043 705/7.12 |
| 2011/0213883 | A1 | 9/2011 | Athey et al. | |
| 2011/0288900 | A1* | 11/2011 | McQueen | G06Q 10/06311 705/7.16 |
| 2011/0295635 | A1* | 12/2011 | Basak | G06Q 10/00 705/7.12 |
| 2012/0100844 | A1 | 4/2012 | Baldemair et al. | |
| 2012/0215574 | A1* | 8/2012 | Driessnack | G06Q 10/0639 705/7.12 |
| 2012/0221845 | A1* | 8/2012 | Ferris | H04L 67/1097 713/150 |
| 2012/0278831 | A1* | 11/2012 | van Coppenolle | G06Q 30/06 725/25 |
| 2013/0080565 | A1* | 3/2013 | van Coppenolle | G06Q 30/02 709/213 |
| 2013/0090969 | A1* | 4/2013 | Rivere | G06Q 10/06 705/7.19 |
| 2013/0103749 | A1* | 4/2013 | Werth | G06F 9/5072 709/203 |
| 2013/0191843 | A1* | 7/2013 | Sarkar | G06F 9/505 718/105 |
| 2013/0303221 | A1* | 11/2013 | Otomo | G06F 9/5094 455/509 |
| 2013/0304903 | A1* | 11/2013 | Mick | H04L 67/16 709/224 |
| 2013/0311740 | A1* | 11/2013 | Watanabe | G06F 3/061 711/165 |
| 2014/0149591 | A1 | 5/2014 | Bhattacharya et al. | |
| 2014/0222485 | A1* | 8/2014 | Cantor | G06Q 10/0633 705/7.22 |
| 2014/0236660 | A1* | 8/2014 | Cantor | G06Q 10/0633 705/7.23 |
| 2014/0344004 | A1* | 11/2014 | Surendran | G06Q 10/06316 705/7.26 |
| 2015/0012495 | A1* | 1/2015 | Prahlad | G06F 3/0649 707/640 |
| 2015/0040134 | A1* | 2/2015 | Leggette | H04L 67/1097 718/103 |
| 2015/0244775 | A1* | 8/2015 | Vibhor | G06Q 10/06 709/203 |
| 2015/0254679 | A1* | 9/2015 | te Booij | G06Q 30/0201 705/7.29 |
| 2015/0370627 | A1* | 12/2015 | Nakajima | G06F 11/3409 714/2 |
| 2016/0063192 | A1* | 3/2016 | Johnson | G16H 40/20 705/2 |
| 2016/0124657 | A1* | 5/2016 | Resch | G06F 3/065 711/114 |
| 2016/0269312 | A1* | 9/2016 | Cavalcante | G06Q 10/0631 |
| 2016/0350721 | A1* | 12/2016 | Comerford | G06Q 10/1095 |

OTHER PUBLICATIONS

Bittencourt et al., "Impact of Communication Uncertainties on Workflow Scheduling in Hybrid Clouds", Globecom 2012—Communications QoS, Reliability and Modelling Symposium, pp. 1623-1628.

Brucker et al., "Resource-constrained project scheduling: Notation, classification, models, and methods", European Journal of Operational Research, vol. 112, (1999) pp. 3-41.

Welsh, "Dealing With Uncertainty in Project Schedules", MPUG, http://www.mpug.com/articles/dealing-with-uncertainty-in-project-schedules/, Feb. 28, 2012, pp. 1-4.

Lin et al., "A new robust optimization approach for scheduling under uncertainty: I. Bounded uncertainty", Computers and Chemical Engineering, vol. 28, (2004), pp. 1069-1085.

Hiatt et al., "Strengthening Schedules Through Uncertainty Analysis", IJCAI 2009, pp. 1-6.

Balasubramanian et al., "Scheduling Optimization under Uncertainty—An Alternative Approach", Mar. 2002, pp. 1-35.

Mell et al., "The NIST Definition of Cloud Computing", National Institute of Standards and Technology, Information Technology Laboratory, Version 15, Oct. 7, 2009.

* cited by examiner

SCHEDULING AND SIMULATION SYSTEM

BACKGROUND

The present disclosure generally relates to computer systems, and more specifically to scheduling and simulation tools.

The speed and efficiency with which a set of tasks are performed may be improved by an electronic scheduling tool that matches the tasks to suitable resources available to complete them according to one or more schedules. The set of tasks may be referred to as a project.

A cloud migration project (or other IT transformation processes), for example, may be divided into one or more migration units (also known as waves). A migration unit may include one or more inter-dependent tasks (for example, for a set of servers migrated in the same time window, often one or more enterprise applications have to be tested together).

Manually optimizing such a schedule for cloud migration may not practical because it may take too long and cost too much. A detailed attempt to schedule a migration can take a prohibitively long time. Even building an optimizing scheduling system for migration with deterministic task times using a powerful optimizer with special scheduling features can take significant design work.

BRIEF SUMMARY

According to an embodiment of the invention, a method for evaluating project schedules on a computer system identifies one or more tasks and determines a set of deterministic task durations for them. The method determines an initial schedule for completing the tasks based on the deterministic task durations and based on one or more resources. The method determines a set of probabilistic durations for the plurality of tasks and simulates execution of the tasks according to the initial schedule based on the set of probabilistic durations.

According to a further embodiment of the invention, a computer system for evaluating project schedules includes a processor, a tangible storage medium, and a program having program instructions to execute a method. The program includes instructions to identify one or more tasks and determine a set of deterministic task durations for them. It also includes instructions to determine an initial schedule for completing the tasks based on the deterministic task durations and based on one or more resources. Additional instructions determine a set of probabilistic durations for the plurality of tasks and simulate execution of the tasks according to the initial schedule based on the set of probabilistic durations.

According to a further embodiment of the invention, a computer program product for evaluating project schedules on a computer system includes a tangible storage device embodying program code. The program code is executable by a processor of a computer to perform a method. The method identifies one or more tasks and determines a set of deterministic task durations for them. The method determines an initial schedule for completing the tasks based on the deterministic task durations and based on one or more resources. The method determines a set of probabilistic durations for the plurality of tasks and simulates execution of the tasks according to the initial schedule based on the set of probabilistic durations.

DETAILED DESCRIPTION

Some embodiments of the invention may recognize that a task may have a probabilistic duration in addition to a deterministic duration, and failing to use this probabilistic property (probabilistic durations may include, for example, network transfers, manual steps that involve variations in complexity and in their required skills, adjustments whose frequency and time can vary, and tasks that depend on third-party availability); generating schedules that have a high rate of over assignment of resources to tasks, thereby increasing costs; restricting the number of project units (for example, the number of servers to be transferred in a cloud migration project) per change window (for example, a weekend); and in some circumstances, necessitating a split of a project over multiple units, leading to undesirable intermediate states.

Embodiments of the invention provide for scheduling and simulation systems and methods that can assist in rapid cloud-based infrastructure migration processes (or performing other IT transformation tasks). Embodiments of the invention also replace manual, rule-of-thumb-based and error-prone techniques for scheduling, planning and cost estimation of cloud migration projects by taking advantage of data-driven techniques. Project migration managers may use embodiments of the invention to quickly evaluate and compare costs across multiple migration scenarios having different process and resource alternatives without actually implementing them, and assists them in making statistically robust plans that respect time and/or cost or other considerations important to the project.

Figure 1:
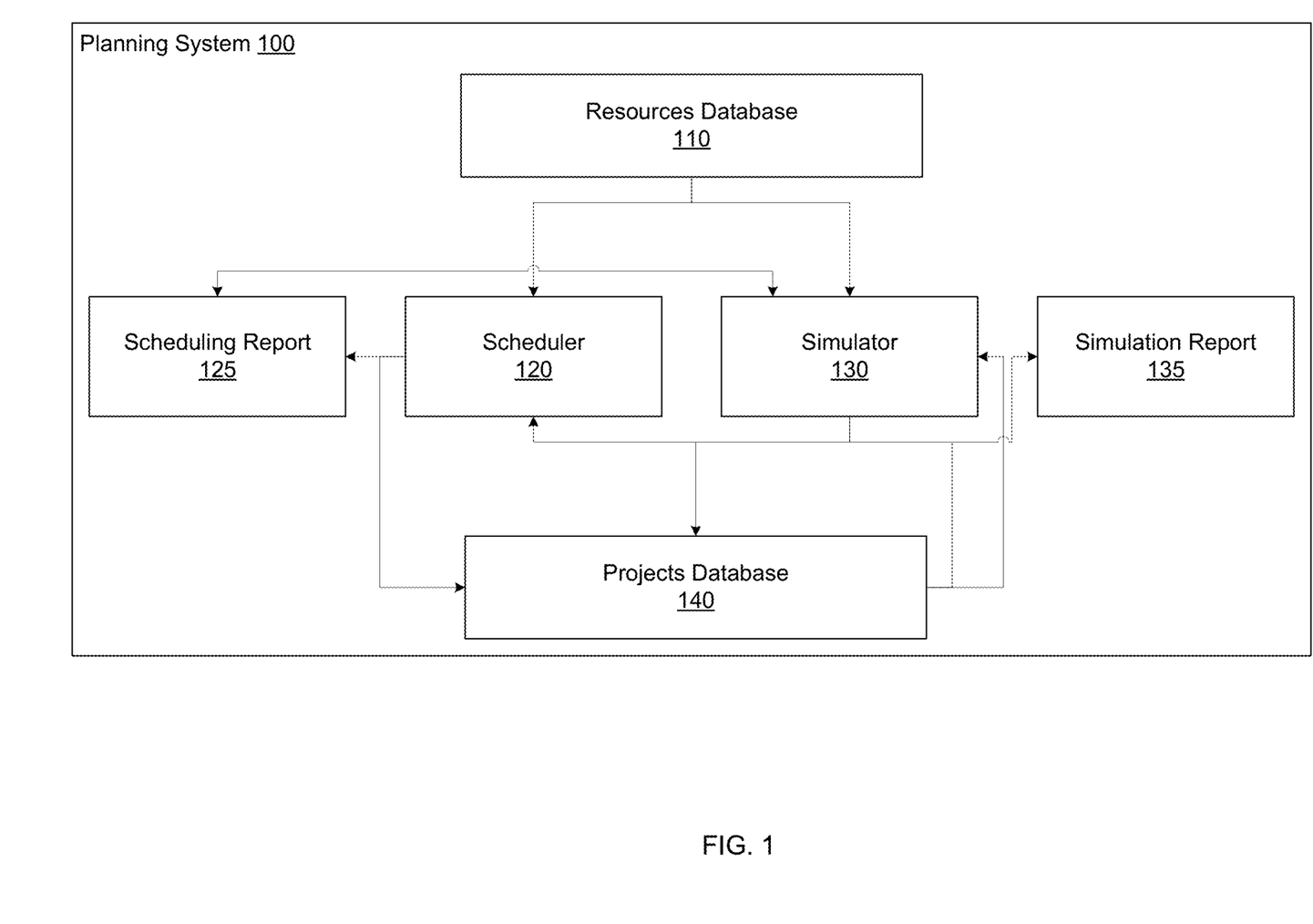
FIG. 1 is a block diagram of a planning system, according to an aspect of the invention.

FIG. 1 is a block diagram of a planning system 100, according to an aspect of the invention. The planning system 100 may include a resources database 110 and a projects database 140, in communication with a scheduler 120 and a simulator 130 via a network (not shown). The scheduler 120 and simulator 130 may be programs, functions, or modules of a computer program (not shown) executable by a processor of the planning system 100, or may be embodied as one or more connected computing systems.

Figure 4:
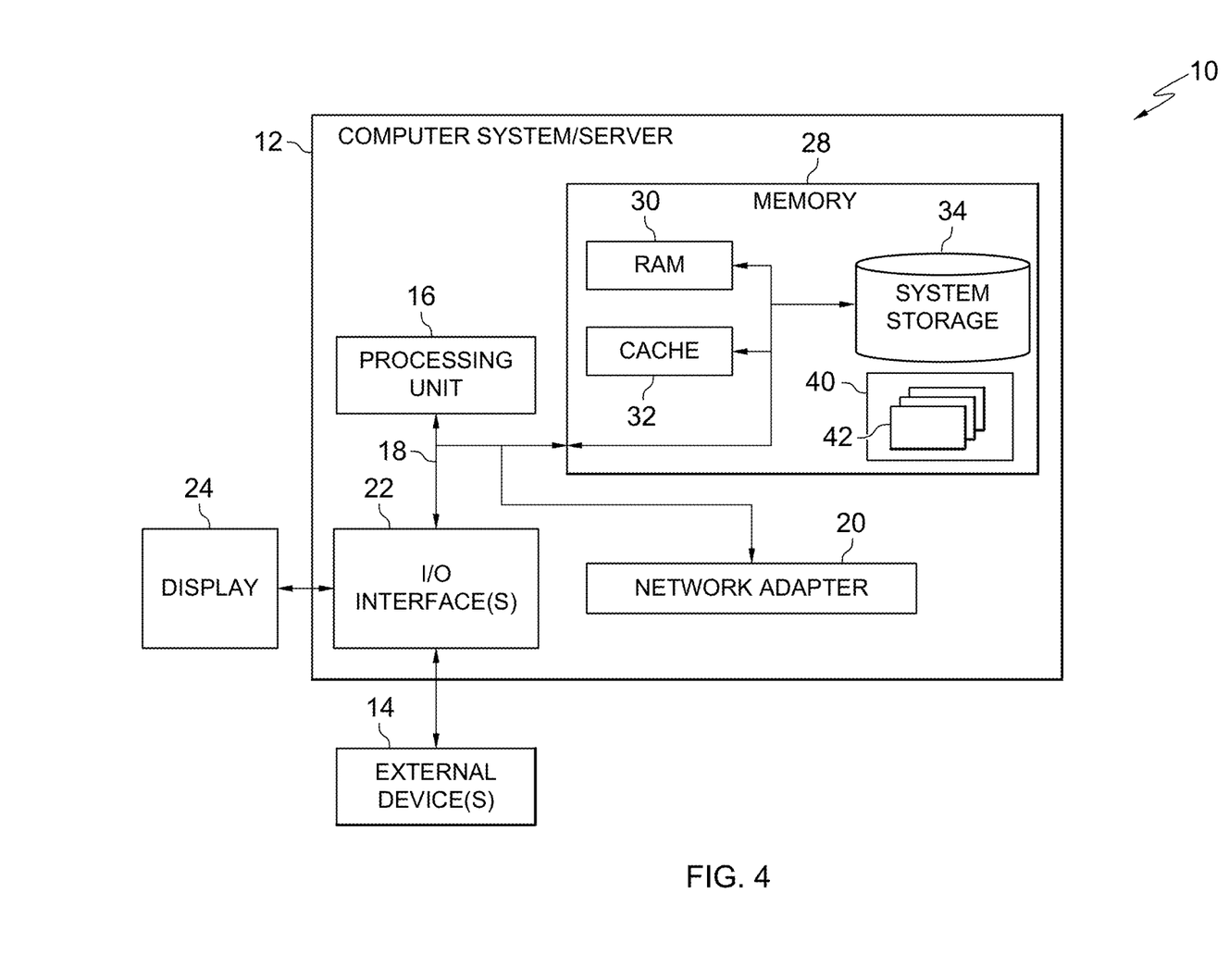
FIG. 4 is a block diagram of a general purpose computer, according to an aspect of the invention.

Planning system 100 may be implemented using a computing node such as the cloud computing node of FIG. 4. It is not necessary that the computing node described in FIG. 4 be a cloud computing node and may be, instead, implemented using a general purpose computer.

In an embodiment, planning system 100 may generate one or more schedules for performing tasks in a project. In one example, the project may be a cloud migration project having corresponding tasks performable using one or more resources including, for example, computing systems, software, and personnel.

Projects database 140 may contain records of one or more cloud migration projects for which a schedule is needed; for example, $P_1$-$P_n$. Each cloud migration project may include a collection of cloud migration tasks associated with the cloud migration project; for example, $T_1$-$T_m$. Completion of the set of migration tasks may be assumed to complete the cloud migration project. A cloud migration task may be associated with one or more properties that define aspects of the task. For example, these properties may include one or more of a task duration value (measured, for example, in terms of hours) or duration probability distribution, a set of hardware or software resources (e.g., network bandwidth, data storage) required to execute the task, a set of defined skills required to complete the task, and task dependencies (a task dependency may exist where a given task may require finishing before one or more other tasks can begin). For example, transferring a server over a network as part of the cloud migration project may require first capturing the server into an image. Therefore, all other tasks may depend from this first task. As a further example, testing the accuracy of a migration unit upon transfer may require that the transfer actually occur beforehand.

According to exemplary and non-limiting embodiments, cloud migration tasks may include: a physical-to-virtual (P2V) operation, transfer of a server image via a network transfer or via a storage medium transfer, registering a server in the cloud, various adjustments to cloud standards (e.g., to new network settings, security requirements, preconditions of agents to be installed, the actual agent install, or uninstall of conflicting agents), tests, debugging, and cut-over to production.

Resources database 110 may contain records of one or more cloud migration resources available to complete one or more cloud migration tasks; for example, $R_1$-$R_k$. A cloud migration resource may be defined as a resource that planning system 100 identifies as available for executing one or more of the cloud migration tasks in a cloud migration project. The cloud migration resource therefore may have a set of associated properties such as associated cloud migration tasks (corresponding to tasks which the resource may be used to complete), availability, cost, speed, efficiency, rank (each property of a given resource may be ranked compared to corresponding properties of other resources), and other information.

Examples of cloud migration resources include: physical or virtual computing devices and resources, such as computers, storage devices, connectivity devices, memory, and I/O devices, in particular those specialized by hardware or software for tasks such as P2V, or adjustments, or cloud registrations; networks (in particular bandwidth on a wide-area network for transferring server images); and human resources such as an engineer having a set of identified skills (e.g., preforming P2V operations, or performing adjustments on servers of a given type), or an owner of a business application needed for testing. Different tasks may need different resources.

In one example, a sample project $P_1$ may include tasks $T_1$-$T_5$ and may have resources $R_1$-$R_3$ available for performing these tasks. Each task may have a set of required skills, and each resource may have a set of available skills. Scheduler 120 may match resources to tasks based on their shared skills and further based on additional criteria, including task durations. This information may be stored in resources database 110 and projects database 140 (which need not be separate databases), in the form of electronic records, as shown in TABLE 1. In one example, $T_1$ may be performed using $R_1$ (since only $R_1$ has both of the skills required to perform $T_1$). Other tasks and resources may be matched accordingly. Skills matching is only one example. Matching may be done based on other properties of both the tasks and the resources. Moreover, as resources are assigned to tasks, they may be unavailable for assignment to other tasks for the duration of the tasks to which they already have been assigned.

TABLE 1

SAMPLE PROJECT $P_1$ & ASSOCIATED TASKS, RESOURCES & SKILLS $T_1$ {Skill 1, Skill 2}
$T_2$ {Skill 1, Skill 3}
$T_3$ {Skill 4}
$T_4$ {Skill 2, Skill 4}
$T_5$ {Skill 1}
$R_1$ {Skill 1, Skill 2, Skill 3, Skill 4}
$R_2$ {Skill 2, Skill 3}
$R_3$ {Skill 4}

Scheduler 120 may generate cloud migration schedules for certain deterministic tasks, according to a set of optimization criteria. For example, schedule 120 may consult resources database 110 to identify available migration resources and match them to migration tasks, based on the tasks' requirements and the resources' properties matching those tasks, and based on the resources' availability. Schedule 120 may also determine an order of migration task execution for each task, along with migration resource matching for each task. The order may be based on the optimization criteria. In one example, the optimization criteria may require scheduler 120 to generate a schedule such that all migration tasks finish as soon as possible, while maintaining tasks dependencies. In another example, the optimization criteria may require scheduler 120 to minimize cost, while maintaining task dependencies.

Scheduler 120 may generate one or more schedules, as described above, and may generate a scheduling report 125 containing the generated schedules and associated information, including, for example, an optimization score.

Simulator 130 may simulate execution of one or more of the schedules generated by scheduler 120, by retrieving scheduling report 125. Simulating execution of a given schedule may include, in an embodiment, the following functions or steps: determining a start time for executing a cloud migration project; identifying task dependencies and a task-execution order; determining a start time for each task; identifying the migration resources to be used for that task; determining a duration for execution of the task; and adding the determined duration of the execution of the task to a total duration for the migration project (or for a migration unit).

In an embodiment, simulator 130 may determine task durations based on deterministic durations, which may be based on measured durations for performing a given task in the past (for example, copying a server having the size 500 GB may have a deterministic duration of 20 minutes). Deterministic durations used by simulator 130 may be based on durations outputted by scheduler 120, including best durations (for example, shorter durations), as well as n next-to-best durations, where n may be a configurable number.

In another embodiment, simulator 130 may determine task durations based on probabilistic durations, which may be based on one or more factors including: minimum times, error probabilities, an expected duration, an expected duration adjusted according to standard deviation, a maximum expected duration, or a combination of these factors. Where past measurements exist for a task duration, a duration distribution type known to simulator 130 may be fitted to the measurements by, for example, a regression method using, for example, triangular or normal distributions.

Simulator 130 may simulate the cloud migration project end-to-end (by simulating execution of every task in the project) according to one or more schedules generated by scheduler 120 and provided in scheduling report 125, using simulator's 130 own simulated task times (e.g., based on a probabilistic approach), or using durations determined based on durations fitted to deterministic measurements.

In an embodiment, simulating functions of simulator 130 may include respecting assignment of cloud migration resources to tasks; assuming that each resource performs its associated task in the scheduled order; respecting task dependencies (i.e., a task is started only if all other tasks from which it depends have finished); and allowing earlier task start times than those scheduled (for example, where a probabilistic task duration determined by simulator 130 is shorter than a deterministic task duration determined by scheduler 120).

Simulator 130 may output a record of its simulation, for one or more initial schedules, into a simulation report 135. Simulation report 135 may include one or more electronic or computer records that store or reflect the output of simulator 130.

Simulator 130 (or another component of planning system 100, such as a selecting module, may evaluate the overall duration distributions output by simulator 130 for one or more initial schedules. Simulator 130 may order the evaluated initial schedules based on an expected duration value, and expected duration value plus standard deviation, a maximum observed value, or another value. In some embodiments, it may be preferable to use the expected value plus an additional value since, in some circumstances, it may be preferable to use a schedule that has a high probability to complete within a certain known time, even if the average duration is a bit longer than that of another schedule with a wider range of possible durations.

Simulator 130 may select the best schedule as a final schedule based on a selection or optimization criteria. The selection/optimization criteria may be predetermined or user defined. It may be determined in advance or dynamically. For example, the selection/optimization criteria may include a criterion that gives priority to a fastest completing schedule, or to a least costly schedule. Alternatively, if simulator 130 detects a variance value greater than a threshold value between durations of the initial schedules and its definition of overall duration, simulator 130 may request that scheduler 120 modify its task duration estimates and to provide revised initial schedules for simulator 130 to simulate.

In another embodiment, simulator 130 may determine task durations based on a combination of deterministic and probabilistic durations.

Figure 2:
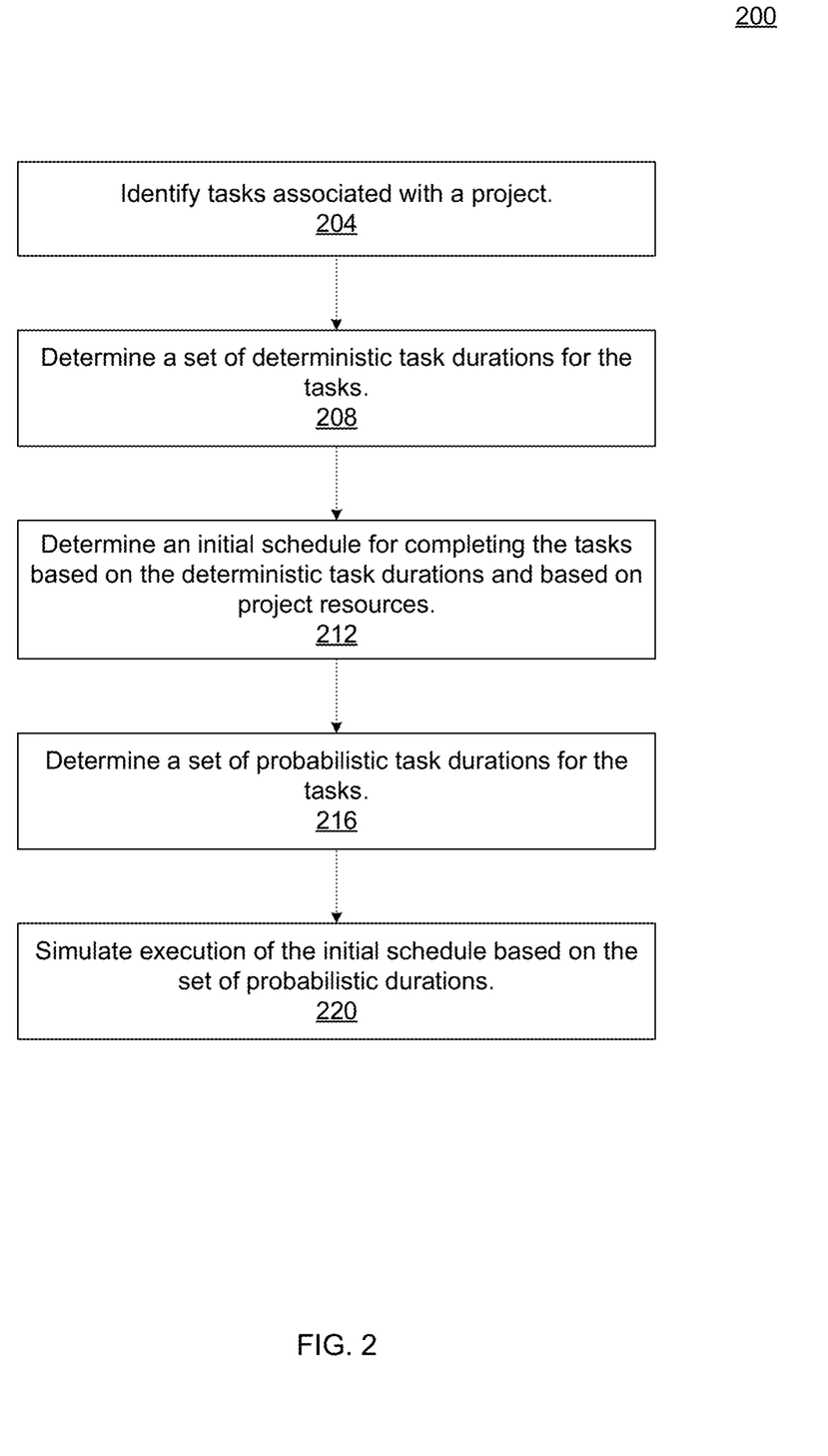
FIG. 2 is a flowchart of a method for planning cloud migration tasks using the planning system of FIG. 1, according to an aspect of the invention.

FIG. 2 is a flowchart of a method 200 for planning execution of a cloud migration project including its associated tasks, using the planning system 100 of FIG. 1, according to an aspect of the invention. Steps of method 200 may be executed using a processor of a computer that encompasses, or is a part of, planning system 100, or another system.

Referring now to FIGS. 1 and 2, at step 204, scheduler 120 may identify tasks $T_1$-$T_5$ associated with the cloud migration project $P_1$. Scheduler 120 may do so by querying projects database 140. Alternatively, scheduler 120 may receive such identifying information from another source including, for example, from a user. The user may be a system, method, process, or a natural person in communication with scheduler 120 through an I/O device.

At step 208, scheduler 120 may determine a set of deterministic task durations for tasks $T_1$-$T_5$, identified at step 204 based on known information about prior executions of those tasks. A record of deterministic duration(s) for a given task may be included in projects database 140, or in another database. The deterministic duration for a given task may be based on observed average, median, mode, or other observed duration for execution of that task.

At step 212, scheduler 120 may determine an initial schedule for completing the tasks based on the deterministic task durations and based on project resources. Scheduler 120 may do so by querying resources database 110 to identify project resources. In one example, scheduler 120 may identify project $P_1$, tasks $T_1$-$T_5$, and resources $R_1$-$R_3$ as described in Table 1, above. Scheduler 120 may assign one or more resources to one or more tasks in a first set of tasks, based on task dependencies. For example, in a cloud migration project, $T_1$ may be a first task from which all other tasks depend, corresponding to generating a source image of the cloud server to be migrated. Scheduler 120 may assign $R_1$ to $T_1$ based on their shared properties. The assignment may be for a duration $D_1$, which may be a time value determined during step 208 (determined based on, for example, a measured duration of $T_1$ in prior actual cloud migrations). $R_1$ may (but need not) be unavailable to perform other tasks until $T_1$ is fully executed.

In a related embodiment, at step 212, scheduler 120 may determine additional initial schedules based on variations in its scheduling criteria. For example, scheduler 120 may use additional deterministic task durations different from those used to determine the initial task duration. In another example, scheduler 120 may change the assignment of resources to tasks where more than one resource is available to perform a given task.

In a related embodiment, scheduler 120 may apply additional constraints to its scheduling criteria. For example, where planning system 100 is used by an IT services firm to provide cloud migration services for a client, these additional constraints may include client constraints. Client constraints may include a set of conditions or constraints defined based on client needs. In one example, a client constraint may be cost. For example, some resources may be available for matching to certain tasks. However, these resources may have a cost property that individually, or in the aggregate, exceed a client-defined cost cap. Therefore, scheduler 120 eliminates one or more of such resources from the set of resources that are otherwise designated as available. Another example is based on nationality or geographic locations of resources, because many clients may have compliance requirements regarding what nationalities of people can access servers or datasets within their jurisdictions, or from what locations such human or automated access may take place.

Whether scheduler 120 determines one or several initial schedules, these schedules may be stored in a scheduling report 125 that represents the output of scheduler 120. Scheduling report 125 may be stored on a tangible storage device of planning system 100, or of another system, or communicated to other components of planning system 100, or of another system.

At step 216, simulator 130 may determine a set of probabilistic task durations for the tasks identified at step 204. Determining the set of probabilistic durations may include determining task durations based on one or more factors including: minimum times, error probabilities, an expected duration, an expected duration adjusted according to standard deviation, a maximum expected duration, or a combination of these factors. Where past measurements exist for a task duration, a duration distribution type known to simulator 130 may be fitted to the measurements by, for example, a regression method using, for example, triangular or normal distributions. Probabilistic task durations may also be determined according to expected durations based on a mathematically expected value of a random variable if the duration is given as a probability distribution (such as "normal distribution" with certain parameters).

At step 220, simulator 130 may simulate execution of the initial schedule(s) based on the set of probabilistic durations. Simulating execution of the initial schedule may include, in an embodiment, the following functions or steps: determining a start time for executing a cloud migration project; identifying task dependencies and a task-execution order; determining a start time for each task; identifying the migration resources to be used for that task; determining a probabilistic duration for execution of the task; and adding the determined probabilistic duration of the execution of the task to a total duration for the migration project (or for a migration unit).

According to an embodiment of the invention, simulator 130 may simulate an end-to-end cloud migration process using each initial schedule, and may use its own simulated cloud migration task times, or those measured based on past migrations, or those given as probability distributions. For example, where cloud migration task durations are measured during previous cloud migrations, a duration distribution type known to simulator 130 may be fitted to the measurements by, for example, a regression method. Simple cases include triangular or normal distributions. Simulating by using a schedule means that the assignment of resources to tasks is respected, that each resource performs its/his/her tasks in the scheduled order, and that task dependence is respected, i.e., a task only starts if other tasks it depends on have finished. The simulator is allowed to start a task at an earlier time than the scheduled start time.

According to an embodiment of the invention, simulator 130 may determine duration and time costs (and other metrics) for the initial schedules generated by scheduler 120, based on the simulations by simulator 130.

Simulator 220 may output results of its simulation in the form of a simulation report 135. Simulation report 135 may be stored on a tangible storage device of planning system 100, or of another system, or communicated to other components of planning system 100, or of another system.

In a related embodiment, where multiple initial schedules are simulated, simulator 130 may rank the simulated initial schedules based on one or more factors including, without limitation: duration (for example, a shorter scheduler may be preferable to a longer one); cost (a given schedule may use more resources and incur more costs than another schedule; or it may use fewer but costlier resources than another schedule); reliability; conformity of probabilistic durations to deterministic durations; and other factors.

In a related embodiment, simulator 130 may compare the probabilistic durations it has generated to the deterministic durations determined by scheduler 120. If the deviation between the two sets of durations is greater than a threshold value, for example, simulator 130 may cause scheduler 120 to repeat the step of generating the initial schedule(s) by revising its deterministic durations. For example, if scheduler 120 initially used only expected values to determine the deterministic durations, scheduler 120 may now use expected values plus standard deviation so as to get a wider margin of safety to accommodate individual tasks whose execution may overrun their expected duration. Alternatively, simulator 130 may reduce the ranking for any initial schedule whose underlying deterministic durations deviate from the probabilistic durations determined by simulator 130 by more than the threshold value.

In a related embodiment, scheduling report 125, simulation report 135, or both, may be in the form of a Gantt diagram (or an underlying dataset representable as a Gantt diagram); a matrix (where entries in the matrix's column/row identifier represent tasks listed according to their execution order, and entries in the matrix's row/column identifier represent resources available to perform the corresponding task; or a critical path.

In a related embodiment, simulator 130 may recommend, based on its simulation, that an overall duration value of the project be increased because the simulation shows that it is unlikely that the project can be completed according to the initial or simulated schedules, or that doing so would not be desirable (because, for example, it may exceed a cost cap associated with the project).

In a related embodiment, simulator 130 may recommend an increase in the number of resources to be used for the project.

According to an embodiment of the invention, some of the functions of scheduler 120 may be implemented using the code provided in Table 2, below.

TABLE 2

SAMPLE CODE FOR SCHEDULER 120

```
fLogger.info("Searching all possible variants ");
for ( Task task : tasks ) {
    //possible interval for tasks
    IloIntervalVar interval=this.intervalvar(task.getDuration( ),
    task.getName( ));
    tasksIntervals.add(interval);
    //associative array for relation with possible and resulted order of
    tasks
    taskIntervalsRelation.put(task, interval);
    //allocation tasks to workers
    IntervalVarList alltasks = new IntervalVarList( );
    boolean hasSuitableWorker=false;
    for (Worker worker : workers) {
        //inform if we will have tasks without any worker
        if(worker.hasSkillsList(task.getSkillsList( ))){
            hasSuitableWorker=true;
            //suitable worker founded and we have possible variant
            Variant variant=new Variant( );
            variant.setTask(task);
            variant.setWorker(worker);
            //add variant to all possible variants
            variants.add(variant);
            IloIntervalVar wtask = this.intervalVar(task.getDuration( ),
            String.valueOf(variant.getId( )));
            //mark that variant is possible
            wtask.setOptional( );
            //calculation efficiency part
            IloNumToNumStepFunction workerCalendar =
            this.numToNumStepFunction( );
            for (Shift shift : worker.getShiftList( )) {
                Integer efficiency=100; //for this project we
                have efficiency 100%
                workerCalendar.addValue(shift.getStartTime( ),
                shift.getFinishTime( ),efficiency );
            }
            wtask.setIntensity(workerCalendar,100);
            //remove intersections using worker calendar
            this.add(this.forbidStart(wtask, workerCalendar));
            this.add(this.forbidEnd(wtask, workerCalendar));
            //add variant to the alternative array
            alttasks.add(wtask);
            workerTasks.get(worker.getId( )).add(wtask);
            allTasks.add(wtask);
            ends.add(this.endOf(interval));
        }
```

TABLE 2-continued

SAMPLE CODE FOR SCHEDULER 120

```
    }
    // ADD ALTERNATIVE BRUNCH TO OPTIMIZATION
    MECHANISM
        this.add(this.alternative(interval, alttasks.toArray( )));
}
fLogger.info("Finish searching all possible variants.
Variants"+variants.size( ));
```

Figure 3:
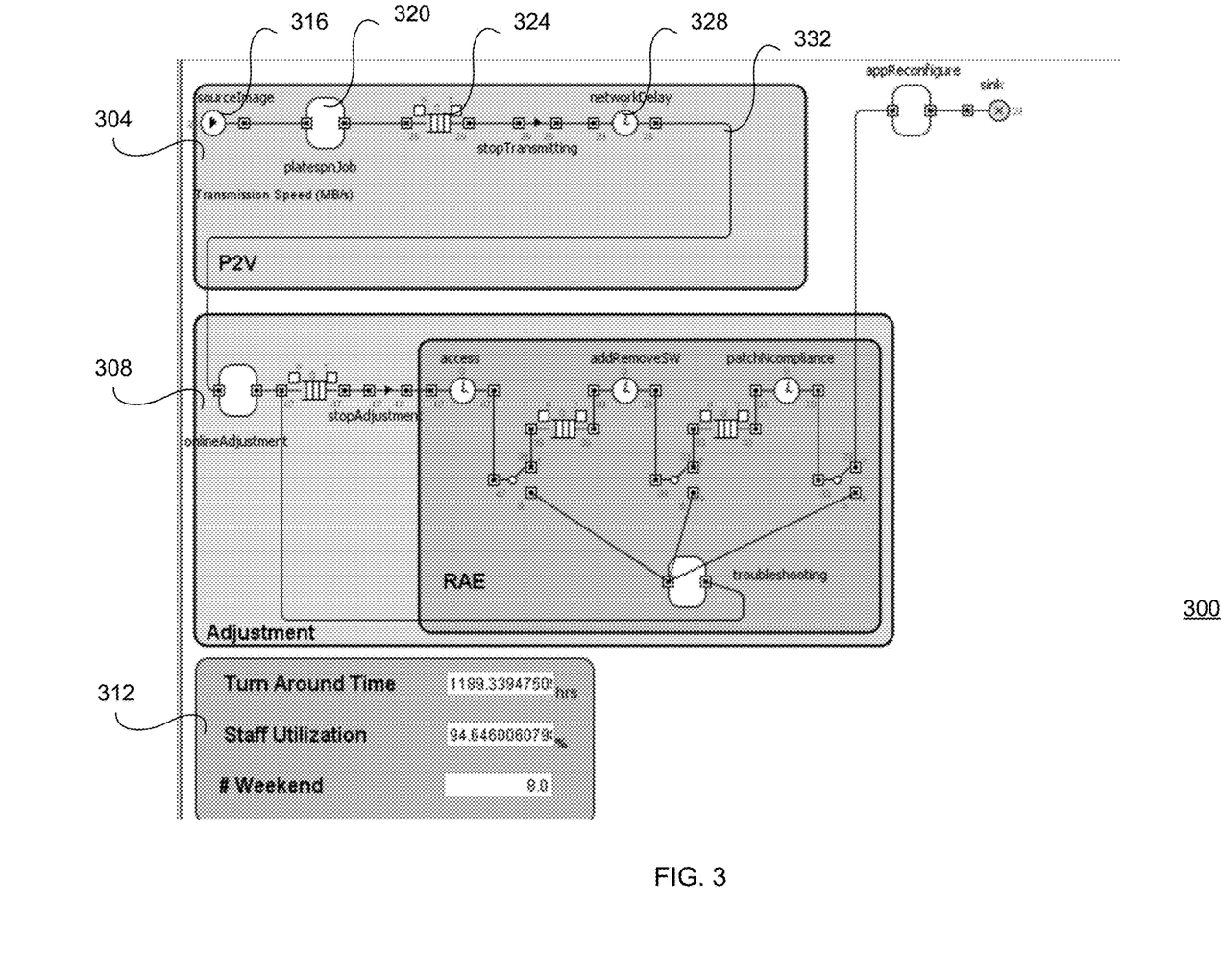
FIG. 3 is a simulation generated by a simulator component of the planning system of FIG. 1, according to an aspect of the invention.

FIG. 3 is a block diagram of a sample output screen 300 of planning system 100 of FIG. 1, according to an embodiment of the invention. Output screen 300 includes two migration units: P2V (physical to virtual) unit 304 including a set of tasks, and adjustment unit 308 (itself containing an RAE unit), containing a set of tasks. Output screen 300 also includes a statistics section 312.

Each migration unit in output screen 300 may include one or more boxes 320 representing tasks, items 316 to be worked on by those tasks; one or more queues 324 representing one or more tasks queued for completion in the scheduling process (for example, the queue labeled with reference number 324 indicates that 29 tasks are pending in the queue; events 328 such as a network delay, and connections 332 indicating task execution orders.

Statistics section 312 indicates various metrics about the contents of output screen 300, including, for example, total project execution time and staff utilization (which may be one type of resource utilization).

Output screen 300 may represent, in one embodiment, the output of simulator 130 as indicated by simulation report 135. It represents a simulated schedule having a particular task execution order respecting task dependencies, for one or more migration units.

One or more output screens 300 may be utilized by a user through an I/O device to compare various schedules to determine a preferred schedule, without having to actually implement the schedule.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows. On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows. Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows. Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
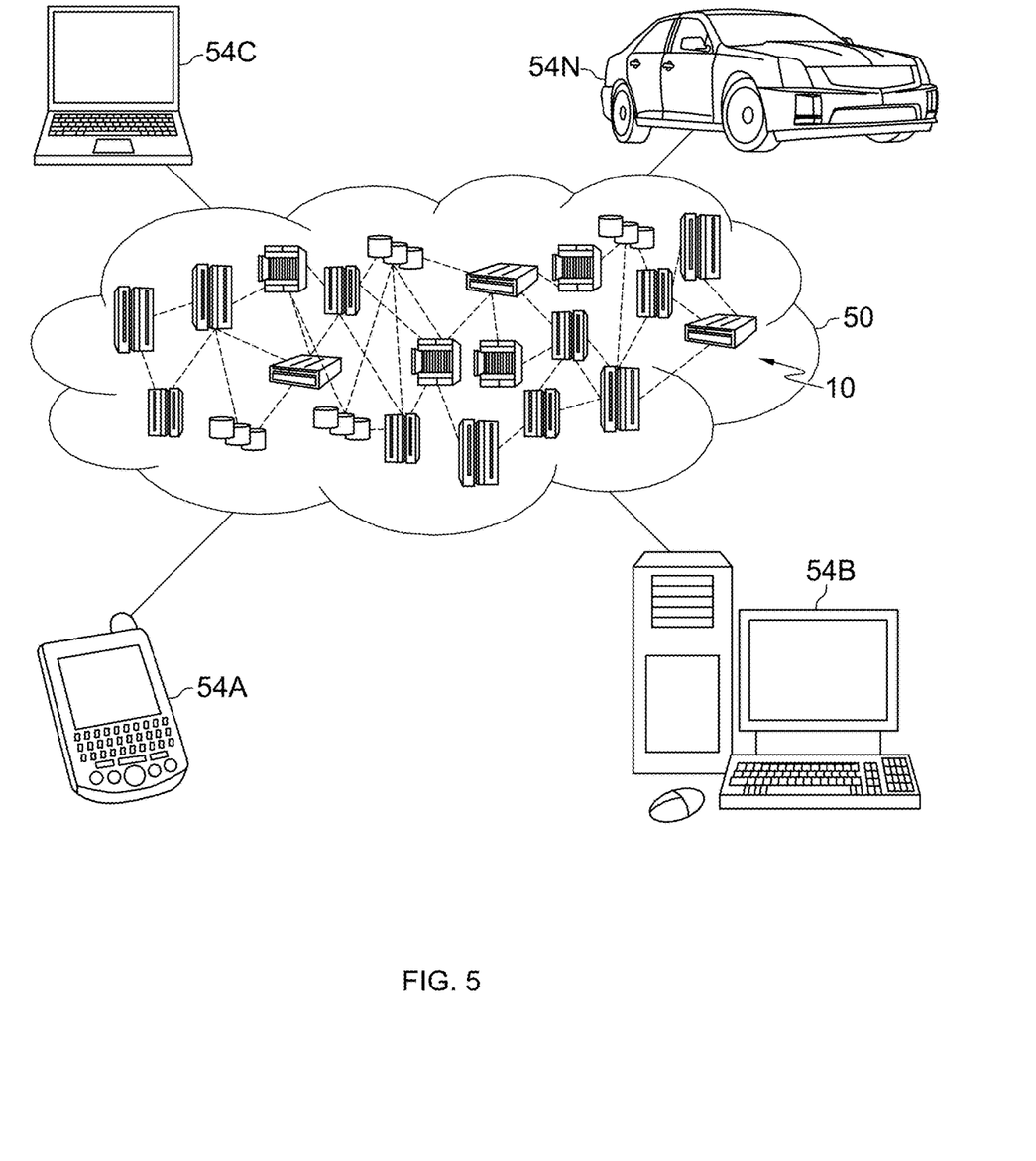
FIG. 5 is a block diagram of an illustrative cloud computing environment, according to an aspect of the invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
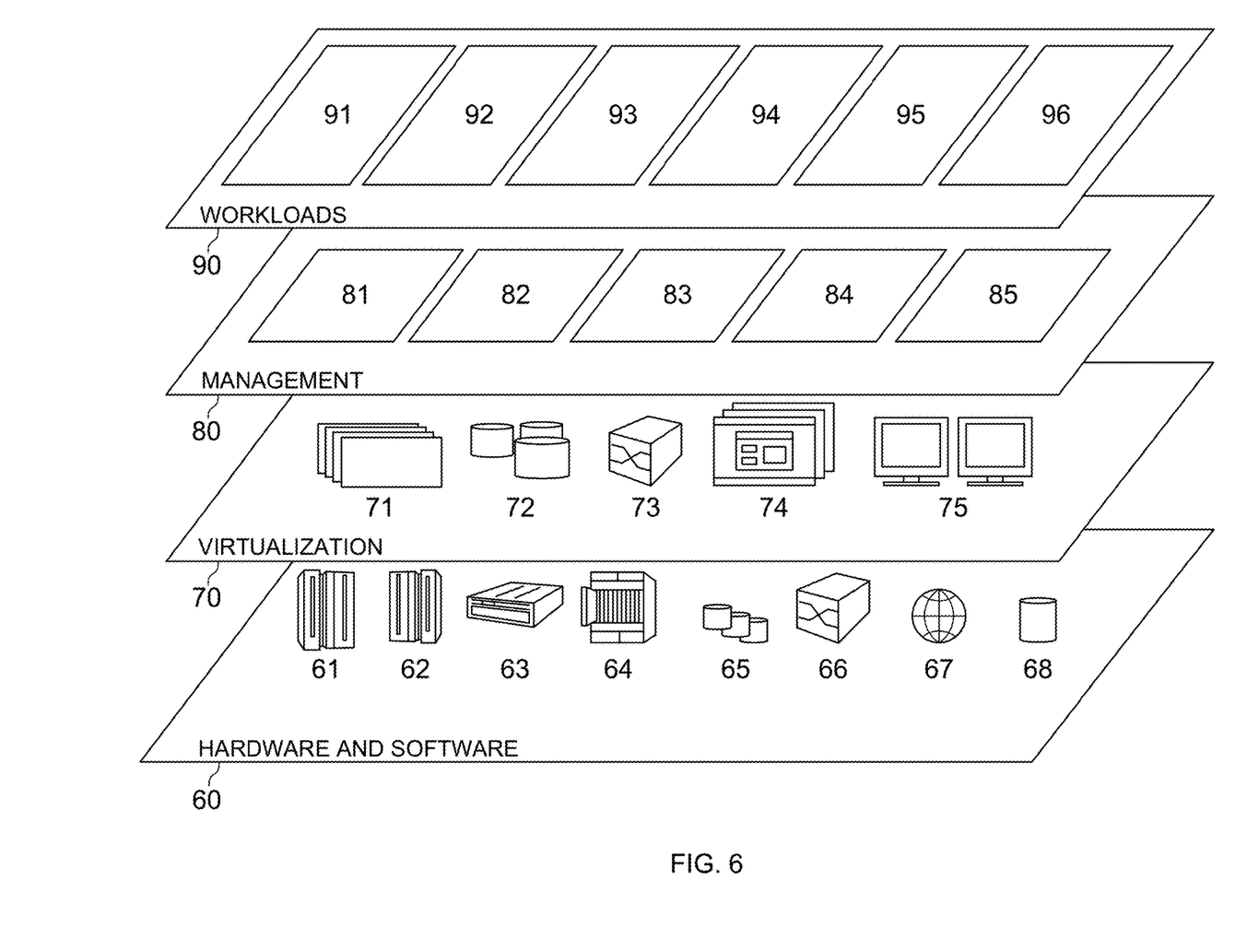
FIG. 6 is a block diagram of functional layers of the illustrative cloud computing environment of FIG. 5, according to an aspect of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cloud migration services 96.

In a related embodiment, cloud migration services may be performed as part of management layer 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
   identifying, using a scheduler module, a plurality of tasks associated with a cloud migration process, wherein the scheduler module is executed by a processor;
   determining, using the scheduler module, a set of deterministic task durations for the identified plurality of tasks;
   calculating concurrently, using the scheduler module, a plurality of initial schedules for completing the identified plurality of tasks associated with the cloud migration process based on the determined deterministic task durations and based on a plurality of resources identified in a resources database using the scheduler module;
   determining, using a simulator module, a set of probabilistic durations for the identified plurality of tasks, wherein the simulator module is executed by the processor;
   simulating concurrently, using the simulator module, execution of the calculated plurality of initial schedules for completing the cloud migration process based on the determined set of probabilistic durations;
   generating, using the simulator module, a graphical user interface (GUI) representing the simulated execution of the calculated plurality of initial schedules; and
   displaying, using the generated GUI, an output screen including a first section visualizing a set of physical to virtual tasks, a second section positioned below the first section and visualizing a set of adjustment tasks, and a third section positioned below the second section and visualizing at least one project execution metric, and wherein the first section and the second section displays at least one first graphical element representing a corresponding task, at least one second graphical element representing a respective item to be worked on by the corresponding task, at least one third graphical element representing a respective queued task, at least one fourth graphical element representing a respective task event, and at least one connecting graphical element representing a task execution order.

2. The method of claim 1, further comprising:
   generating at least one additional initial schedule based on the deterministic task durations and based on the plurality of resources; and
   simulating execution of the at least one additional initial schedule based on the set of probabilistic durations.

3. The method of claim 2, further comprising:
   ranking the initial schedule and the at least one additional initial schedule based on the simulating.

4. The method of claim 1, wherein the probabilistic task durations are determined, for a given task, based on one or more of:
   an expected completion duration;
   an expected completion duration plus a standard deviation duration; and
   a maximum observed duration.

5. The method of claim 1, further comprising:
   revising the set of deterministic task durations based on the set of probabilistic task durations; and
   repeating the step of determining the initial schedule based on the revising.

6. The method of claim 1, further comprising:
   generating a scheduling report based on the initial schedule; and
   generating a simulation report based on simulating the initial schedule,
   wherein one or both of the scheduling report and the simulation report comprise one or more of a Gantt diagram, a matrix, and a critical path.

7. The method of claim 1, further comprising:
   recommending, based on the simulating, one or more of an increase in the plurality of resources and an increase in an overall project duration.

8. A computer system for evaluating project schedules, comprising:
   a computer device having a processor and a tangible storage device; and
   a program embodied on the storage device for execution by the processor, the program having a plurality of program instructions to:
   identifying, using a scheduler module, a plurality of tasks associated with a cloud migration process, wherein the scheduler module is executed by a processor;
   determining, using the scheduler module, a set of deterministic task durations for the identified plurality of tasks;
   calculating concurrently, using the scheduler module, a plurality of initial schedules for completing the identified plurality of tasks associated with the cloud migration process based on the determined deterministic task durations and based on a plurality of resources identified in a resources database using the scheduler module;

determining, using a simulator module, a set of probabilistic durations for the identified plurality of tasks, wherein the simulator module is executed by the processor;

simulating concurrently, using the simulator module, execution of the calculated plurality of initial schedules for completing the cloud migration process based on the determined set of probabilistic durations;

generating, using the simulator module, a graphical user interface (GUI) representing the simulated execution of the calculated plurality of initial schedules; and displaying, using the generated GUI, an output screen including a first section visualizing a set of physical to virtual tasks, a second section positioned below the first section and visualizing a set of adjustment tasks, and a third section positioned below the second section and visualizing at least one project execution metric, and wherein the first section and the second section displays at least one first graphical element representing a corresponding task, at least one second graphical element representing a respective item to be worked on by the corresponding task, at least one third graphical element representing a respective queued task, at least one fourth graphical element representing a respective task event, and at least one connecting graphical element representing a task execution order.

9. The system of claim 8, wherein the plurality of program instructions further comprises instructions to:

generate at least one additional initial schedule based on the deterministic task durations and based on the plurality of resources; and simulate execution of the at least one additional initial schedule based on the set of probabilistic durations.

10. The system of claim 9, wherein the plurality of program instructions further comprises instructions to:

rank the initial schedule and the at least one additional initial schedule based on the simulating.

11. The system of claim 8, wherein the probabilistic task durations are determined, for a given task, based on one or more of:

an expected completion duration;

an expected completion duration plus a standard deviation duration; and a maximum observed duration.

12. The system of claim 8, wherein the plurality of program instructions further comprises instructions to:

revise the set of deterministic task durations based on the set of probabilistic task durations; and repeat determining of the initial schedule based on the revising.

13. A computer program product for evaluating project schedules, comprising a non-transitory tangible storage device having program code embodied therewith, the program code executable by a processor of a computer to perform a method, the method comprising:

identifying, using a scheduler module, a plurality of tasks associated with a cloud migration process, wherein the scheduler module is executed by a processor;

determining, using the scheduler module, a set of deterministic task durations for the identified plurality of tasks;

calculating concurrently, using the scheduler module, a plurality of initial schedules for completing the identified plurality of tasks associated with the cloud migration process based on the determined deterministic task durations and based on a plurality of resources identified in a resources database using the scheduler module;

determining, using a simulator module, a set of probabilistic durations for the identified plurality of tasks, wherein the simulator module is executed by the processor;

simulating concurrently, using the simulator module, execution of the calculated plurality of initial schedules for completing the cloud migration process based on the determined set of probabilistic durations;

generating, using the simulator module, a graphical user interface (GUI) representing the simulated execution of the calculated plurality of initial schedules; and displaying, using the generated GUI, an output screen including a first section visualizing a set of physical to virtual tasks, a second section positioned below the first section and visualizing a set of adjustment tasks, and a third section positioned below the second section and visualizing at least one project execution metric, and wherein the first section and the second section displays at least one first graphical element representing a corresponding task, at least one second graphical element representing a respective item to be worked on by the corresponding task, at least one third graphical element representing a respective queued task, at least one fourth graphical element representing a respective task event, and at least one connecting graphical element representing a task execution order.

14. The computer program product of claim 13, wherein the method further comprises:

generating, by a processor, at least one additional initial schedule based on the deterministic task durations and based on the plurality of resources; and simulating, by a processor, execution of the at least one additional initial schedule based on the set of probabilistic durations.

15. The computer program product of claim 14, wherein the method further comprises:

ranking, by a processor, the initial schedule and the at least one additional initial schedule based on the simulating.

16. The computer program product of claim 13, wherein the probabilistic task durations are determined, for a given task, based on one or more of:

an expected completion duration;

an expected completion duration plus a standard deviation duration; and a maximum observed duration.

17. The computer program product of claim 13, wherein the method further comprises:

revising, by a processor, the set of deterministic task durations based on the set of probabilistic task durations; and repeating, by a processor, the step of determining the initial schedule based on the revising.

* * * * *